United States Patent
Ilola et al.

(10) Patent No.: US 11,974,026 B2
(45) Date of Patent: Apr. 30, 2024

(54) APPARATUS, A METHOD AND A COMPUTER PROGRAM FOR VOLUMETRIC VIDEO

(71) Applicant: Nokia Technologies Oy, Espoo (FI)

(72) Inventors: Lauri Aleksi Ilola, Tampere (FI); Vinod Kumar Malamal Vadakital, Tampere (FI); Kimmo Tapio Roimela, Tampere (FI); Jaakko Olli Taavetti Keränen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/906,658

(22) PCT Filed: Mar. 15, 2021

(86) PCT No.: PCT/FI2021/050184
§ 371 (c)(1),
(2) Date: Sep. 19, 2022

(87) PCT Pub. No.: WO2021/191500
PCT Pub. Date: Sep. 30, 2021

(65) Prior Publication Data
US 2023/0134675 A1    May 4, 2023

(30) Foreign Application Priority Data
Mar. 26, 2020    (FI) ...................................... 20205305

(51) Int. Cl.
*H04N 21/81* (2011.01)
*G06T 15/20* (2011.01)
*H04N 21/442* (2011.01)
*H04N 21/654* (2011.01)
*H04N 21/6587* (2011.01)

(52) U.S. Cl.
CPC ........... *H04N 21/816* (2013.01); *G06T 15/20* (2013.01); *H04N 21/44218* (2013.01); *H04N 21/654* (2013.01); *H04N 21/6587* (2013.01)

(58) Field of Classification Search
CPC ........... H04N 21/816; H04N 21/44218; H04N 21/654; H04N 21/6587; H04N 21/234345;
(Continued)

(56) References Cited

U.S. PATENT DOCUMENTS

| | | | |
|---|---|---|---|
| 2019/0253734 A1 | 8/2019 | Lee et al. | |
| 2020/0045285 A1 | 2/2020 | Varerkar et al. | |
| 2020/0322403 A1* | 10/2020 | Dvir | H04N 21/2402 |
| 2021/0295567 A1* | 9/2021 | Lee | G06T 9/001 |

FOREIGN PATENT DOCUMENTS

| | | |
|---|---|---|
| GB | 2572996 A | 10/2019 |
| WO | 2021/053269 A1 | 3/2021 |

OTHER PUBLICATIONS

"Draft Text of ISO/IEC DIS 23090-10 Carriage of Video-based Point Cloud Compression Data", Systems, ISO/IEC JTC1/SC29/WG11, N19066, Feb. 21, 2020, pp. 1-46.

(Continued)

*Primary Examiner* — John R Schnurr
(74) *Attorney, Agent, or Firm* — Joseph C. Drish; Harrington & Smith

(57) ABSTRACT

An example embodiment relates to a method comprising: receiving (700), by a client device, information about a scene associated with a 3D presentation for initiating viewport rendering by an application, wherein said scene is hosted by a server as one or more encoded 2D patches, said 2D patches being projections of the 3D representation of the scene; providing (702) the server with information for selecting 2D patches required to reconstruct at least one segment of the 3D scene as visible in a given viewport; obtaining (704), from the server, one or more video bitstreams generated based on the selected 2D patches and related metadata for extracting said 2D patches from said one or more video bitstreams; and rendering (706), by the client device, the given viewport as a sub-segment of the 3D representation of the scene based on said one or more 2D patches and the related metadata.

16 Claims, 8 Drawing Sheets

(58) Field of Classification Search
CPC .......... H04N 21/26258; H04N 19/463; H04N 19/167; H04N 19/597; H04N 21/4728; H04N 21/84; G06T 15/20; G06T 9/001
See application file for complete search history.

(56) References Cited

OTHER PUBLICATIONS

"Information technology—Coded Representation of Immersive Media—Part 5: Video-based Point Cloud Compression", ISO/IEC JTC 1/SC 29/WG 11, ISO/IEC 23090-5, 2019, 102 pages.

"Committee Draft of MPEG Immersive Video", Video, ISO/IEC JTC1/SC29/WG11, N19482, Jul. 3, 2020, 82 pages.

Zakharchenko, "V-PCC Codec description", 3DG, ISO/IEC JTC1/SC29/WG11 MPEG2018/N18017, Oct. 2018, 32 pages.

Boyce et al., "Working Draft 2 of Metadata for Immersive Video", Video, ISO/IEC JTC1/SC29/WG11/N18576, Aug. 6, 2019, 37 pages.

"Information Technology—Dynamic Adaptive Streaming over HTTP (DASH)—Part 1: Media Presentation Description and Segment Formats", ISO/IEC 23009-1, Second Edition, May 15, 2014, 152 pages.

Office action received for corresponding Finnish Patent Application No. 20205305, dated Dec. 4, 2020, 9 pages.

International Search Report and Written Opinion received for corresponding Patent Cooperation Treaty Application No. PCT/FI2021/050184, dated Jun. 24, 2021, 16 pages.

\* cited by examiner

APPARATUS, A METHOD AND A COMPUTER PROGRAM FOR VOLUMETRIC VIDEO

RELATED APPLICATION

This application claims priority to PCT Application No. PCT/FI2021/050184, filed on Mar. 15, 2021, which claims priority to Finnish Application No. 20205305, filed on Mar. 26, 2020, each of which is incorporated herein by reference in its entirety.

TECHNICAL FIELD

The present invention relates to an apparatus, a method and a computer program for volumetric video coding.

BACKGROUND

Volumetric video data represents a three-dimensional scene or object and can be used as input for virtual reality (VR), augmented reality (AR) and mixed reality (MR) applications. Such data describes the geometry, e.g. shape, size, position in three-dimensional (3D) space, and respective attributes, e.g. colour, opacity, reflectance and any possible temporal changes of the geometry and attributes at given time instances. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. In dense point clouds or voxel arrays, the reconstructed 3D scene may contain tens or even hundreds of millions of points. One way to compress a time-varying volumetric scene/object is to project 3D surfaces to some number of pre-defined 2D planes. Regular 2D video compression algorithms can then be used to compress various aspects of the projected surfaces. For example, MPEG Video-Based Point Cloud Coding (V-PCC) and MPEG Metadata for Immersive Video (MIV) provide a procedure for compressing a time-varying volumetric scene/object by projecting 3D surfaces onto a number of pre-defined 2D planes, which may then be compressed using regular 2D video compression algorithms. The projection is presented using different patches, where each set of patches may represent a specific object or specific parts of a scene.

In both V-PCC and MIV, the patches are stored in one or more atlases, which are encoded prior to sending them to a client device for rendering and playback. When a user of the client device, such as a head-mounted display (HMD), wants to view the volumetric video from another viewpoint, the client device needs new patches for rendering the new viewpoint. However, when providing the client device with the new patches for rendering the new viewpoint, the procedures of both V-PCC and MIV involve providing additional patch-related data, which is not needed in rendering the new viewport.

SUMMARY

Now, an improved method and technical equipment implementing the method has been invented, by which the above problems are alleviated. Various aspects include a method, apparatuses and a computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided a method comprising receiving, by a client device, information about a scene associated with a 3D presentation for initiating viewport rendering by an application, wherein said scene is hosted by a server as one or more encoded 2D patches, said 2D patches being projections of the 3D representation of the scene; providing the server with information for selecting 2D patches required to reconstruct at least one segment of the 3D scene as visible in a given viewport; obtaining, from the server, one or more video bitstreams generated based on the selected 2D patches and related metadata for extracting said 2D patches from said one or more video bitstreams; and rendering, by the client device, the given viewport as a sub-segment of the 3D representation of the scene based on said one or more 2D patches and the related metadata.

An apparatus according to a second aspect comprises at least one processor and at least one memory, said at least one memory stored with computer program code thereon, the at least one memory and the computer program code configured to, with the at least one processor, cause the apparatus at least to perform: receive information about a scene associated with a 3D presentation for initiating viewport rendering by an application, wherein said scene is hosted by a server as one or more encoded 2D patches, said 2D patches being projections of the 3D representation of the scene; provide the server with information for selecting 2D patches required to reconstruct at least one segment of the 3D scene as visible in a given viewport; obtain, from the server, one or more video bitstreams generated based on the selected 2D patches and related metadata for extracting said 2D patches from said one or more video bitstreams; and render the given viewport as a sub-segment of the 3D representation of the scene based on said one or more 2D patches and the related metadata.

An apparatus according to a third aspect comprises: means for receiving information about a scene associated with a 3D presentation for initiating viewport rendering by an application, wherein said scene is hosted by a server as one or more encoded 2D patches, said 2D patches being projections of the 3D representation of the scene; means for providing the server with information for selecting 2D patches required to reconstruct at least one segment of the 3D scene as visible in a given viewport; means for obtaining, from the server, one or more video bitstreams generated based on the selected 2D patches and related metadata for extracting said 2D patches from said one or more video bitstreams; and means for rendering the given viewport of as a sub-segment of the 3D representation of the scene based on said one or more 2D patches and the related metadata.

According to an embodiment, the apparatus further comprises means for tracking a position and an orientation of a user of the apparatus for generating the information about the viewport.

According to an embodiment, the information about the viewport comprises one or more of the following:
- the position of the viewer in the scene;
- the orientation of the viewer;
- a viewport identification data;
- horizontal and vertical field-of-views (HFoV, VFoV) of the viewport.

According to an embodiment, the apparatus further comprises means for identifying 2D patches, partitions or slices required to render a viewport, based on received metadata; and means for processing the one or more received video bitstreams to generate one or more novel video bitstreams in order to reduce the number of video decoder instances required to decode identified 2D patches; wherein the processing of received video bitstreams includes rewriting slice headers of video coding partitions.

A method according to a fourth aspect comprises: hosting, by a server, one or more encoded 2D patches, said 2D patches being projections of a 3D representation of a scene; providing a client with information about the scene for initiating viewport rendering by an application; obtaining information for selecting 2D patches required to reconstruct at least one segment of the 3D scene as visible in a given viewport; reconstructing one or more video bitstreams based on selected 2D patches and generating metadata required to extract said 2D patches; and providing the client with said one or more video bitstreams and the related metadata required to extract 2D patches from said one or more video bitstreams.

An apparatus according to a fifth aspect comprises at least one processor and at least one memory, said at least one memory stored with computer program code thereon, the at least one memory and the computer program code configured to, with the at least one processor, cause the apparatus at least to perform: host one or more encoded 2D patches, said 2D patches being projections of a 3D representation of a scene; provide a client with information about the scene for initiating viewport rendering by an application; obtain information for selecting 2D patches required to reconstruct at least one segment of the 3D scene as visible in a given viewport; reconstruct one or more video bitstreams based on selected 2D patches and generating metadata required to extract said 2D patches; and provide the client with said one or more video bitstreams and the related metadata required to extract 2D patches from said one or more video bitstreams.

An apparatus according to a sixth aspect comprises: means for hosting one or more encoded 2D patches, said 2D patches being projections of a 3D representation of a scene; means for providing a client with information about the scene for initiating viewport rendering by an application; means for obtaining information for selecting 2D patches required to reconstruct at least one segment of the 3D scene as visible in a given viewport; means for reconstructing one or more video bitstreams based on selected 2D patches and generating metadata required to extract said 2D patches; and means for providing the client with said one or more video bitstreams and the related metadata required to extract 2D patches from said one or more video bitstreams.

According to an embodiment, the apparatus further comprises a spatial database configured to store data about patches needed for rendering viewports and their mutual spatial relationship between the viewports.

According to an embodiment, the apparatus further comprises means for identifying 2D patches, representing a sub-segment of 3D scene, required to render the given viewport.

According to an embodiment, the apparatus further comprises means for packing said identified 2D patches into one or more novel atlases; means for encoding the novel atlases into said one or more novel video bitstreams; means for generating metadata describing the layout of 2D patches on the atlases; means for generating one or more metadata bitstream containing said layout of the 2D patches and information required to re-project said 2D patches into the 3D representation; and means for providing said one or more generated novel video bitstreams and said associated one or more metadata bitstreams to the client.

According to an embodiment, said means for identifying 2D patches are configured to identify one or more encoded video bitstream slices or partitions containing identified 2D patches; and said means for generating said one or more video bitstreams are configured to process information related to identified encoded video bitstream slices and partitions in order to reduce the number of overall video bitstreams.

According to an embodiment, the apparatus further comprises means for providing the patches needed for rendering the given viewport with one or more guard-band patches around said given viewport.

According to an embodiment, the apparatus is configured to maintain data describing a division of the scene into a plurality of sub-viewing-volumes; signal said metadata to a client device; and provide the client device, upon receiving a request for a part of at least one sub-viewing-volume, with an encoded bitstream comprising said part of the at least one sub-viewing-volume.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

Figure 1A:
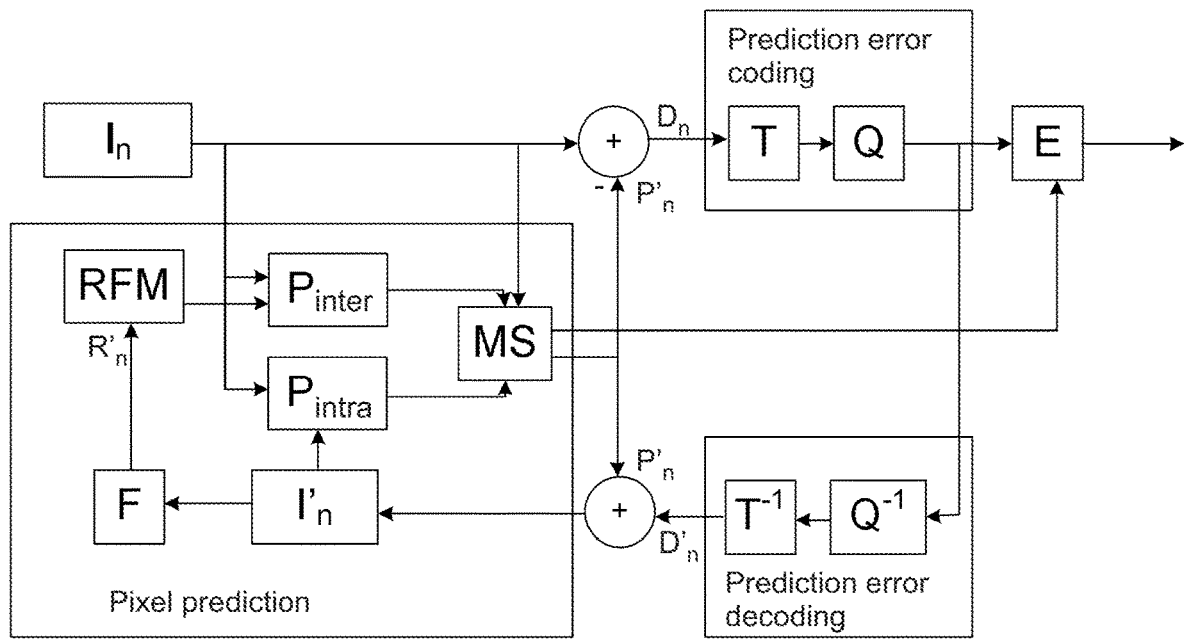
FIGS. 1a and 1b show an encoder and decoder for encoding and decoding 2D pictures.

In the following, several embodiments of the invention will be described in the context of point cloud models for volumetric video coding. It is to be noted, however, that the invention is not limited to specific scene models or specific coding technologies. In fact, the different embodiments have applications in any environment where coding of volumetric scene data is required.

A video codec comprises an encoder that transforms the input video into a compressed representation suited for storage/transmission, and a decoder that can un-compress the compressed video representation back into a viewable form. An encoder may discard some information in the original video sequence in order to represent the video in a more compact form (i.e. at lower bitrate).

Volumetric video may be captured using one or more three-dimensional (3D) cameras. When multiple cameras are in use, the captured footage is synchronized so that the cameras provide different viewpoints to the same world. In contrast to traditional 2D/3D video, volumetric video describes a 3D model of the world where the viewer is free to move and observer different parts of the world.

Volumetric video enables the viewer to move in six degrees of freedom (6DOF): in contrast to common 360° video, where the user has from 2 to 3 degrees of freedom (yaw, pitch, and possibly roll), a volumetric video represents a 3D volume of space rather than a flat image plane. Volumetric video frames contain a large amount of data because they model the contents of a 3D volume instead of just a two-dimensional (2D) plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstruction techniques such as structure from motion, or captured with a combination of cameras and depth sensors such as LiDAR (Light Detection and Ranging), for example.

Volumetric video data represents a three-dimensional scene or object, and thus such data can be viewed from any viewpoint. Volumetric video data can be used as an input for augmented reality (AR), virtual reality (VR) and mixed reality (MR) applications. Such data describes geometry (shape, size, position in 3D-space) and respective attributes (e.g. color, opacity, reflectance, . . . ), together with any possible temporal changes of the geometry and attributes at given time instances (e.g. frames in 2D video). Volumetric video is either generated from 3D models, i.e. computer-generated imagery (CGI), or captured from real-world scenes using a variety of capture solutions, e.g. a multi-camera, a laser scan, a combination of video and dedicated depths sensors, etc. Also, a combination of CGI and real-world data is possible. Examples of representation formats for such volumetric data are triangle meshes, point clouds, or voxel. Temporal information about the scene can be included in the form of individual capture instances, i.e. "frames" in 2D video, or other means, e.g. position of an object as a function of time.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications, such as capturing real world 3D scenes where the topology is not necessarily a 2D manifold.

Another way to represent 3D data is coding this 3D data as a set of texture and depth map as is the case in the multi-view plus depth. Closely related to the techniques used in multi-view plus depth is the use of elevation maps, and multi-level surface maps.

In 3D point clouds, each point of each 3D surface is described as a 3D point with color and/or other attribute information such as surface normal or material reflectance. Point cloud is a set of data points in a coordinate system, for example in a three-dimensional coordinate system being defined by X, Y, and Z coordinates. The points may represent an external surface of an object in the screen space, e.g. in a three-dimensional space.

In dense point clouds or voxel arrays, the reconstructed 3D scene may contain tens or even hundreds of millions of points. If such representations are to be stored or interchanged between entities, then efficient compression of the presentations becomes fundamental. Standard volumetric video representation formats, such as point clouds, meshes, voxel, suffer from poor temporal compression performance. Identifying correspondences for motion-compensation in 3D-space is an ill-defined problem, as both, geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview with depth, have much better compression efficiency, but rarely cover the full scene. Therefore, they provide only limited 6DOF capabilities.

Instead of the above-mentioned approach, a 3D scene, represented as meshes, points, and/or voxel, can be projected onto one, or more, geometries. These geometries may be "unfolded" or packed onto 2D planes (two planes per geometry: one for texture, one for depth), which are then encoded using standard 2D video compression technologies. Relevant projection geometry information may be transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency can be increased greatly. Using geometry-projections instead of 2D-video based approaches based on multiview and depth, provides a better coverage of the scene (or object). Thus, 6DOF capabilities are improved. Using several geometries for individual objects improves the coverage of the scene further. Furthermore, standard video encoding hardware can be utilized for real-time compression/decompression of the projected planes. The projection and the reverse projection steps are of low complexity.

Figure 1B:
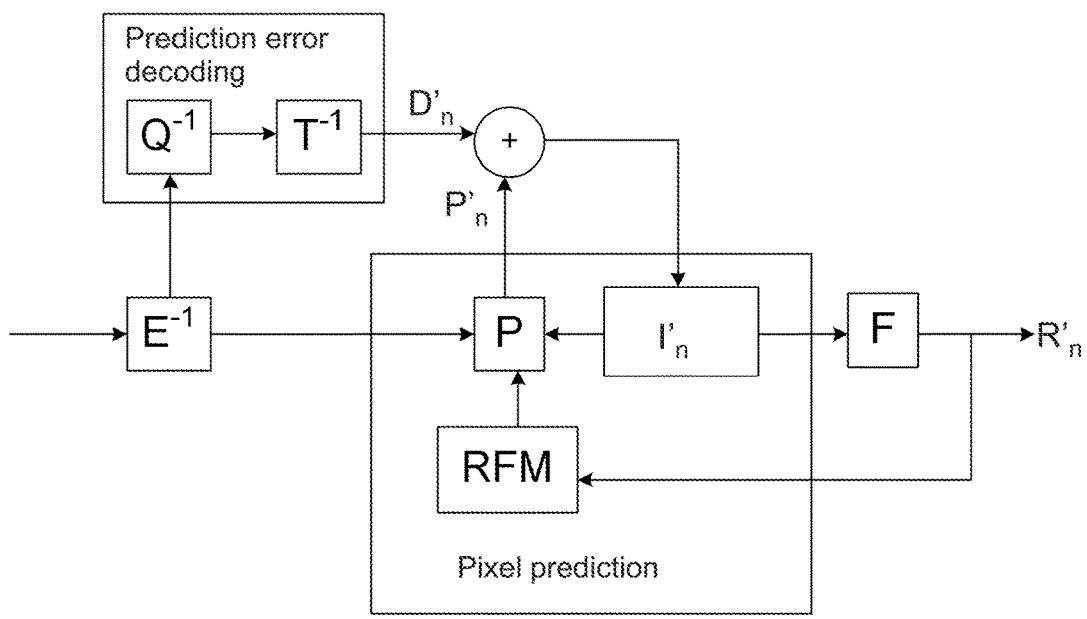

FIGS. 1a and 1b show an encoder and decoder for encoding and decoding the 2D texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 1a. FIG. 1a illustrates an image to be encoded ($I_n$); a predicted representation of an image block ($P'_n$); a prediction error signal ($D_n$); a reconstructed prediction error signal ($D'_n$); a preliminary reconstructed image (I'''); a final reconstructed image (R'''); a transform (T) and inverse transform (T$^{-1}$); a quantization (Q) and inverse quantization (Q$^{-1}$); entropy encoding (E); a reference frame memory (RFM); inter prediction (P$_{inter}$); intra prediction (P$_{intra}$); mode selection (MS) and filtering (F).

An example of a decoding process is illustrated in FIG. 1b. FIG. 1b illustrates a predicted representation of an image block (P'''); a reconstructed prediction error signal (D'''); a preliminary reconstructed image (I'''); a final reconstructed image (R'''); an inverse transform (T$^{-1}$); an inverse quantization (Q$^{-1}$); an entropy decoding (E$^{-1}$); a reference frame memory (RFM); a prediction (either inter or intra) (P); and filtering (F).

Many hybrid video encoders encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Video codecs may also provide a transform skip mode, which the encoders may choose to use. In the transform skip mode, the prediction error is coded in a sample domain, for example by deriving a sample-wise difference value relative to certain adjacent samples and coding the sample-wise difference value with an entropy coder.

Many video encoders partition a picture into blocks along a block grid. For example, in the High Efficiency Video Coding (HEVC) standard, the following partitioning and definitions are used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-adaptive variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

A first texture picture may be encoded into a bitstream, and the first texture picture may comprise a first projection of texture data of a first source volume of a scene model onto a first projection surface. The scene model may comprise a number of further source volumes.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (such as a depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream. It is noted that encoding a geometry (or depth) picture into or along the bitstream with the texture picture is only optional and arbitrary for example in the cases where the distance of all texture pixels to the projection surface is the same or there is no change in said distance between a plurality of texture pictures. Thus, a geometry (or depth) picture may be encoded into or along the bitstream with the texture picture, for example, only when there is a change in the distance of texture pixels to the projection surface.

An attribute picture may be defined as a picture that comprises additional information related to an associated texture picture. An attribute picture may for example comprise surface normal, opacity, or reflectance information for a texture picture. A geometry picture may be regarded as one type of an attribute picture, although a geometry picture may be treated as its own picture type, separate from an attribute picture.

Texture picture(s) and the respective geometry picture(s), if any, and the respective attribute picture(s) may have the same or different chroma format.

Terms texture (component) image and texture (component) picture may be used interchangeably. Terms geometry (component) image and geometry (component) picture may be used interchangeably. A specific type of a geometry image is a depth image. Embodiments described in relation to a geometry (component) image equally apply to a depth (component) image, and embodiments described in relation to a depth (component) image equally apply to a geometry (component) image. Terms attribute image and attribute picture may be used interchangeably. A geometry picture and/or an attribute picture may be treated as an auxiliary picture in video/image encoding and/or decoding.

In volumetric video coding, dynamic 3D objects or scenes are coded and compressed into 2D video streams for storage and delivery and decompressed and decoded upon rendering and playback. The MPEG standards Video-Based Point Cloud Coding (V-PCC; MPEG-I part 5, ISO/IEC 23090-5) and Metadata for Immersive Video (MIV, MPEG-I part 12) are two examples of such volumetric video compression.

Figure 2A:
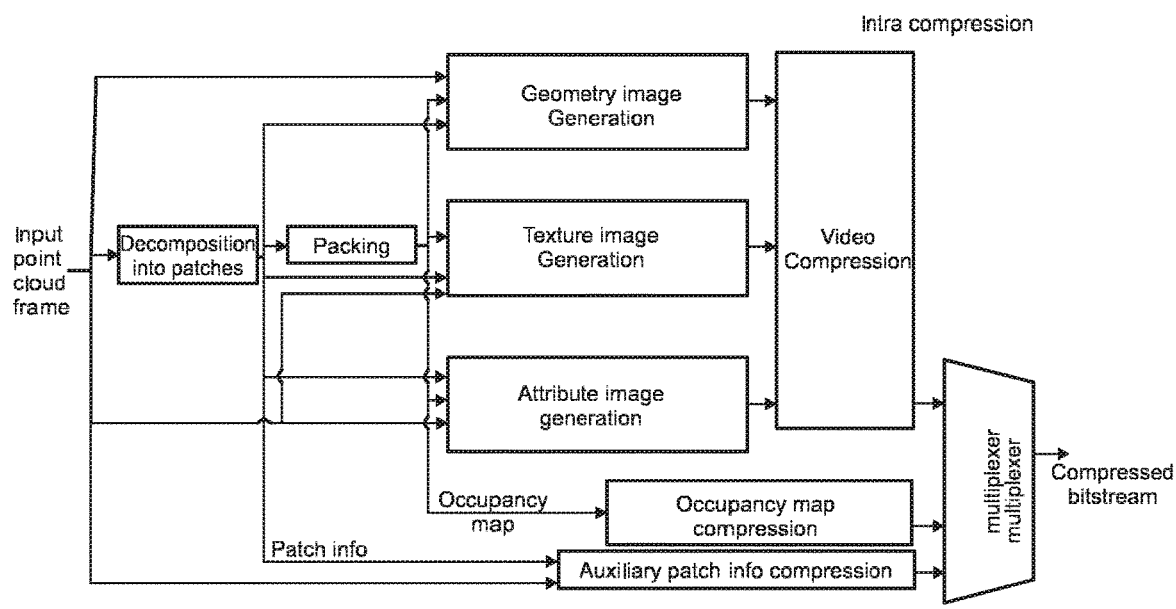
FIGS. 2a and 2b show a compression and a decompression process for 3D volumetric video.
Figure 2B:
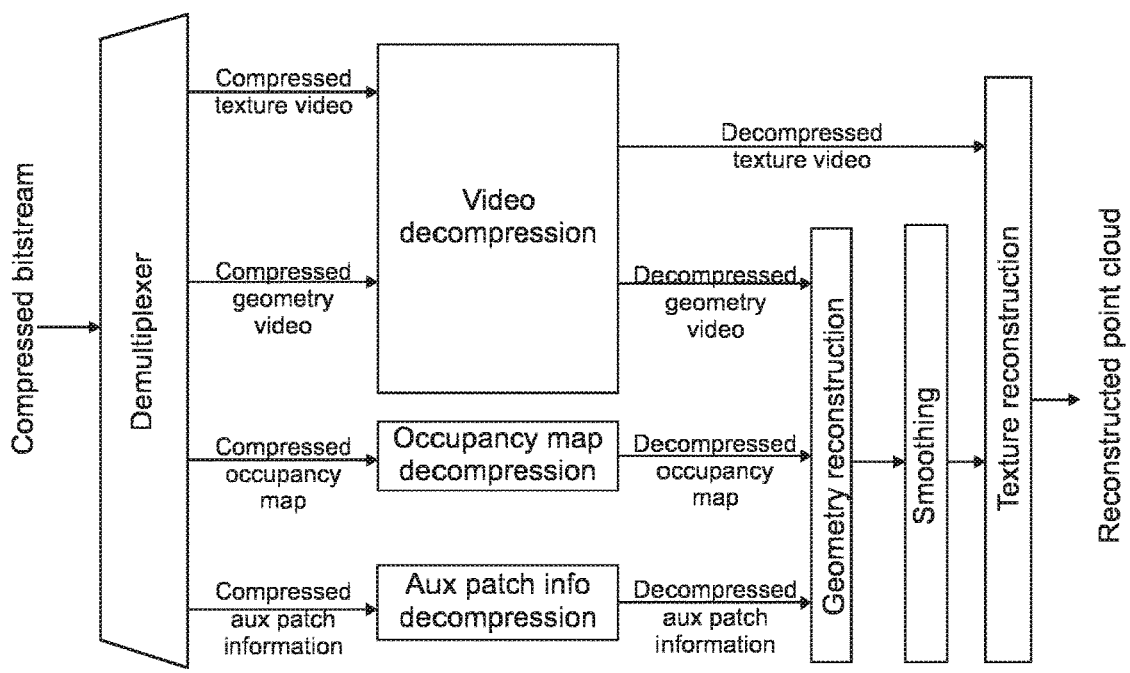

FIGS. 2a and 2b illustrate an overview of exemplified compression/decompression processes. MPEG Video-Based Point Cloud Coding (V-PCC), Test Model a.k.a. TMC2v0 (MPEG N18017) discloses a projection-based approach for dynamic point cloud compression. For the sake of illustration, some of the processes related to video-based point cloud compression (V-PCC) compression/decompression are described briefly herein. For a comprehensive description of the model, a reference is made to MPEG N18017.

Figure 3A:
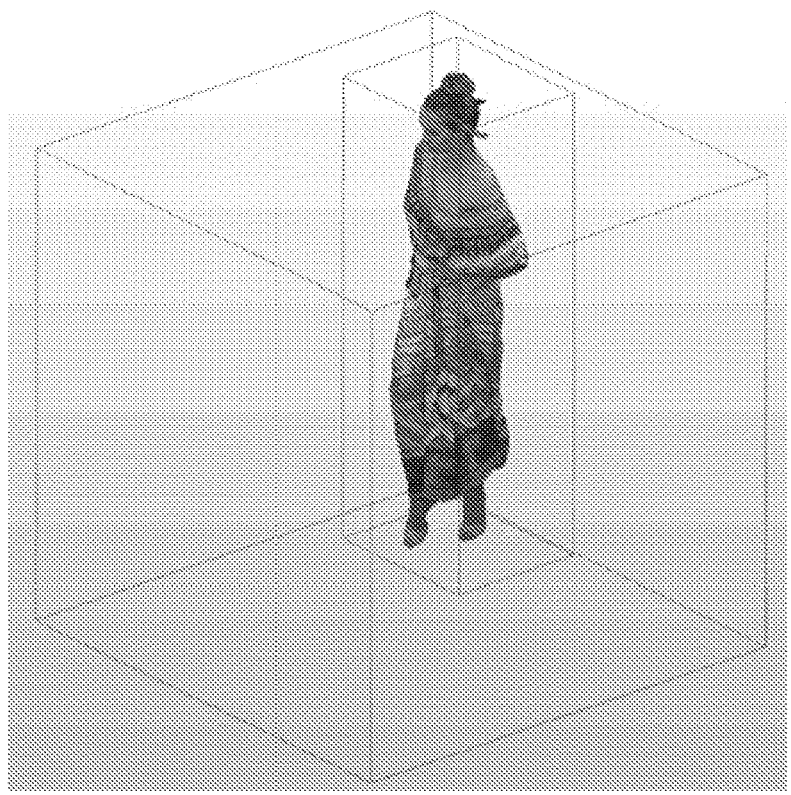
FIGS. 3a and 3b show an example of a point cloud frame and a projection of points to a corresponding plane of a point cloud bounding box.

Each point cloud frame represents a dataset of points within a 3D volumetric space that has unique coordinates and attributes. An example of a point cloud frame is shown on FIG. 3a.

The patch generation process decomposes the point cloud frame by converting 3d samples to 2d samples on a given projection plane using a strategy that provides the best compression. The patch generation process aims at decomposing the point cloud into a minimum number of patches with smooth boundaries, while also minimizing the reconstruction error. In the V-PCC test model TMC2v0, the following approach is implemented.

First, the normal per each point is estimated and the tangent plane and its corresponding normal are defined per each point, based on the point's nearest neighbours m within a predefined search distance. A K-D tree is used to separate the data and find neighbours in a vicinity of a point $p_i$ and a barycenter $c=\bar{p}$ of that set of points is used to define the normal. The barycenter c is computed as follows:

$$c = \bar{p} = \frac{1}{m}\sum_{i=1}^{m} p_i$$

The normal is estimated from eigen decomposition for the defined point cloud as:

$$\sum_{i=1}^{m}(p_i - \bar{p})(p_i - \bar{p})^T$$

Based on this information each point is associated with a corresponding plane of a point cloud bounding box. Each plane is defined by a corresponding normal $\vec{n}_{p_{idx}}$ with values:
(1.0, 0.0, 0.0),
(0.0, 1.0, 0.0),
(0.0, 0.0, 1.0),
(−1.0, 0.0, 0.0),
(0.0, −1.0, 0.0),
(0.0, 0.0, −1.0).

More precisely, each point is associated with the plane that has the closest normal (i.e., maximizes the dot product of the point normal $\vec{n}_{p_i}$ and the plane normal $\vec{n}_{p_{idx}}$.

$$\max_{p_{idx}}\{\vec{n}_{p_i} \cdot \vec{n}_{p_{idx}}\}$$

Figure 3B:
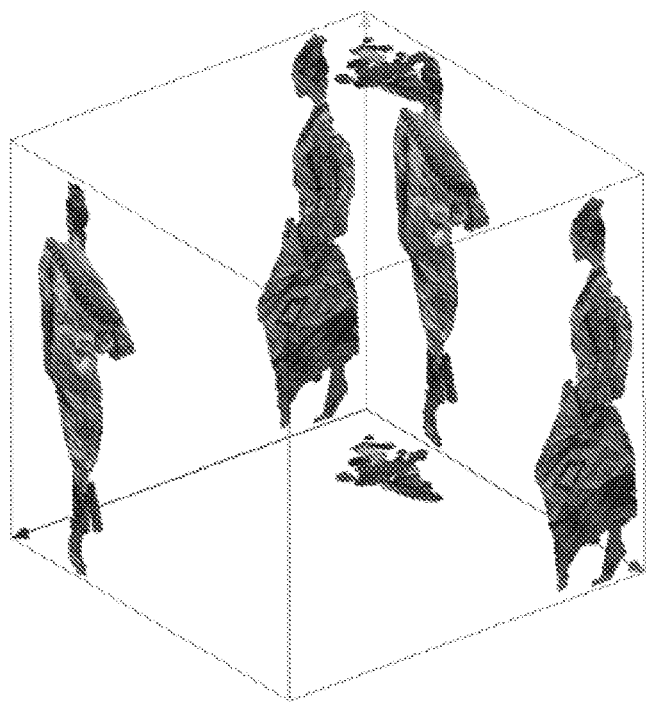

The sign of the normal is defined depending on the point's position in relationship to the "center". The projection estimation description is shown in FIG. 3b.

The initial clustering is then refined by iteratively updating the cluster index associated with each point based on its normal and the cluster indices of its nearest neighbors. The next step consists of extracting patches by applying a connected component extraction procedure.

The packing process aims at mapping the extracted patches onto a 2D grid while trying to minimize the unused space, and guaranteeing that every T×T (e.g., 16×16) block of the grid is associated with a unique patch. Herein, T is a user-defined parameter that is encoded in the bitstream and sent to the decoder.

TMC2v0 uses a simple packing strategy that iteratively tries to insert patches into a W×H grid. W and H are user defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch, then the height H of the grid is temporarily doubled and search is applied again. At the end of the process, H is clipped so as to fit the used grid cells.

The image generation process exploits the 3D to 2D mapping computed during the packing process to store the geometry and texture of the point cloud as images. In order to better handle the case of multiple points being projected to the same pixel, each patch is projected onto two images, referred to as layers. More precisely, let H(u,v) be the set of points of the current patch that get projected to the same pixel (u, v). The first layer, also called the near layer, stores the point of H(u,v) with the lowest depth D0. The second layer, referred to as the far layer, captures the point of H(u,v) with the highest depth within the interval [D0, D0+$\Delta$], where $\Delta$ is a user-defined parameter that describes the surface thickness.

The generated videos have the following characteristics: geometry: W×H YUV420-8 bit, where the geometry video is monochromatic, and texture: W×H YUV420-8 bit, where the texture generation procedure exploits the reconstructed/smoothed geometry in order to compute the colors to be associated with the re-sampled points.

The padding process aims at filling the empty space between patches in order to generate a piecewise smooth image suited for video compression. TMC2v0 uses a simple padding strategy, which proceeds as follows:

Each block of T×T (e.g., 16×16) pixels is processed independently.

If the block is empty (i.e., all its pixels belong to empty space), then the pixels of the block are filled by copying either the last row or column of the previous T×T block in raster order.

If the block is full (i.e., no empty pixels), nothing is done.

If the block has both empty and filled pixels (i.e. a so-called edge block), then the empty pixels are iteratively filled with the average value of their non-empty neighbors.

The generated images/layers are stored as video frames and compressed using a video codec.

In the auxiliary patch information compression, the following meta data is encoded/decoded for every patch:

Index of the projection plane
Index 0 for the normal planes (1.0, 0.0, 0.0) and (−1.0, 0.0, 0.0)
Index 1 for the normal planes (0.0, 1.0, 0.0) and (0.0, −1.0, 0.0)
Index 2 for the normal planes (0.0, 0.0, 1.0) and (0.0, 0.0, −1.0).

2D bounding box (u0, v0, u1, v1)

3D location (x0, y0, z0) of the patch represented in terms of depth $\delta 0$, tangential shift s0 and bi-tangential shift r0. According to the chosen projection planes, ($\delta 0$, s0, r0) are computed as follows:
Index 0, $\delta 0$=x0, s0=z0 and r0=y0
Index 1, $\delta 0$=y0, s0=z0 and r0=x0
Index 2, $\delta 0$=z0, s0=x0 and r0=y0

Also, mapping information providing for each T×T block its associated patch index is encoded as follows:

For each T×T block, let L be the ordered list of the indexes of the patches such that their 2D bounding box contains that block. The order in the list is the same as the order used to encode the 2D bounding boxes. L is called the list of candidate patches.

The empty space between patches is considered as a patch and is assigned the special index 0, which is added to the candidate patches list of all the blocks.

Let I be index of the patch to which belongs the current T×T block and let J be the position of I in L. Instead of explicitly encoding the index I, its position J is arithmetically encoded instead, which leads to better compression efficiency.

The occupancy map consists of a binary map that indicates for each cell of the grid whether it belongs to the empty space or to the point cloud. Herein, one cell of the 2D grid produces a pixel during the image generation process. When considering an occupancy map as an image, it may be considered to comprise occupancy patches. Occupancy patches may be considered to have block-aligned edges according to the auxiliary information described in the previous section. An occupancy patch hence comprises occupancy information for a corresponding texture and geometry patches.

The occupancy map compression leverages the auxiliary information described in previous section, in order to detect the empty T×T blocks (i.e., blocks with patch index 0). The remaining blocks are encoded as follows.

The occupancy map could be encoded with a precision of a B0×B0 blocks. B0 is a user-defined parameter. In order to achieve lossless encoding, B0 should be set to 1. In practice B0=2 or B0=4 result in visually acceptable results, while significantly reducing the number of bits required to encode the occupancy map. The generated binary image covers only a single colour plane. However, given the prevalence of 4:2:0 codecs, it may be desirable to extend the image with "neutral" or fixed value chroma planes (e.g. adding chroma planes with all sample values equal to 0 or 128, assuming the use of an 8-bit codec).

The obtained video frame is compressed by using a video codec with lossless coding tool support (e.g., AVC, HEVC RExt, HEVC-SCC).

Occupancy map is simplified by detecting empty and non-empty blocks of resolution T×T in the occupancy map and only for the non-empty blocks we encode their patch index as follows:

A list of candidate patches is created for each T×T block by considering all the patches that contain that block.

The list of candidates is sorted in the reverse order of the patches.

For each block,
If the list of candidates has one index, then nothing is encoded.
Otherwise, the index of the patch in this list is arithmetically encoded.

The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let ($\delta 0$, s0, r0) be the 3D location of the patch to which it belongs and (u0, v0, u1, v1) its 2D bounding box. P could be expressed in terms of depth $\delta$ (u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image.

The smoothing procedure aims at alleviating potential discontinuities that may arise at the patch boundaries due to compression artifacts. The implemented approach moves boundary points to the centroid of their nearest neighbors.

In the texture reconstruction process, the texture values are directly read from the texture images.

Consequently, V-PCC provides a procedure for compressing a time-varying volumetric scene/object by projecting 3D surfaces onto a number of pre-defined 2D planes, which may then be compressed using regular 2D video compression algorithms. The projection is presented using different patches, where each set of patches may represent a specific object or specific parts of a scene.

In MIV, a similar methodology as in V-PCC is adopted: the 3D scene is segmented into a number of regions according to heuristics based on, for example, spatial proximity and/or similarity of the data in the region. The segmented regions are projected into 2D patches, where each patch contains at least surface texture and depth channels, the depth channel giving the displacement of the surface pixels from the 2D projection plane associated with that patch. The patches are further packed into an atlas that can be encoded and streamed as a regular 2D video.

A key characteristic of MIV, to be noted in particular, is that each patch is a projection towards a virtual camera location, with a set of such virtual camera locations residing in or near the intended viewing region of the scene in question. The viewing region is a sub-volume of space inside which the viewer may move while viewing the scene. Thus, the patches in MIV are effectively small views of the scene. These views are then interpolated between in order to synthesize the final view seen by the viewer.

Figure 4:
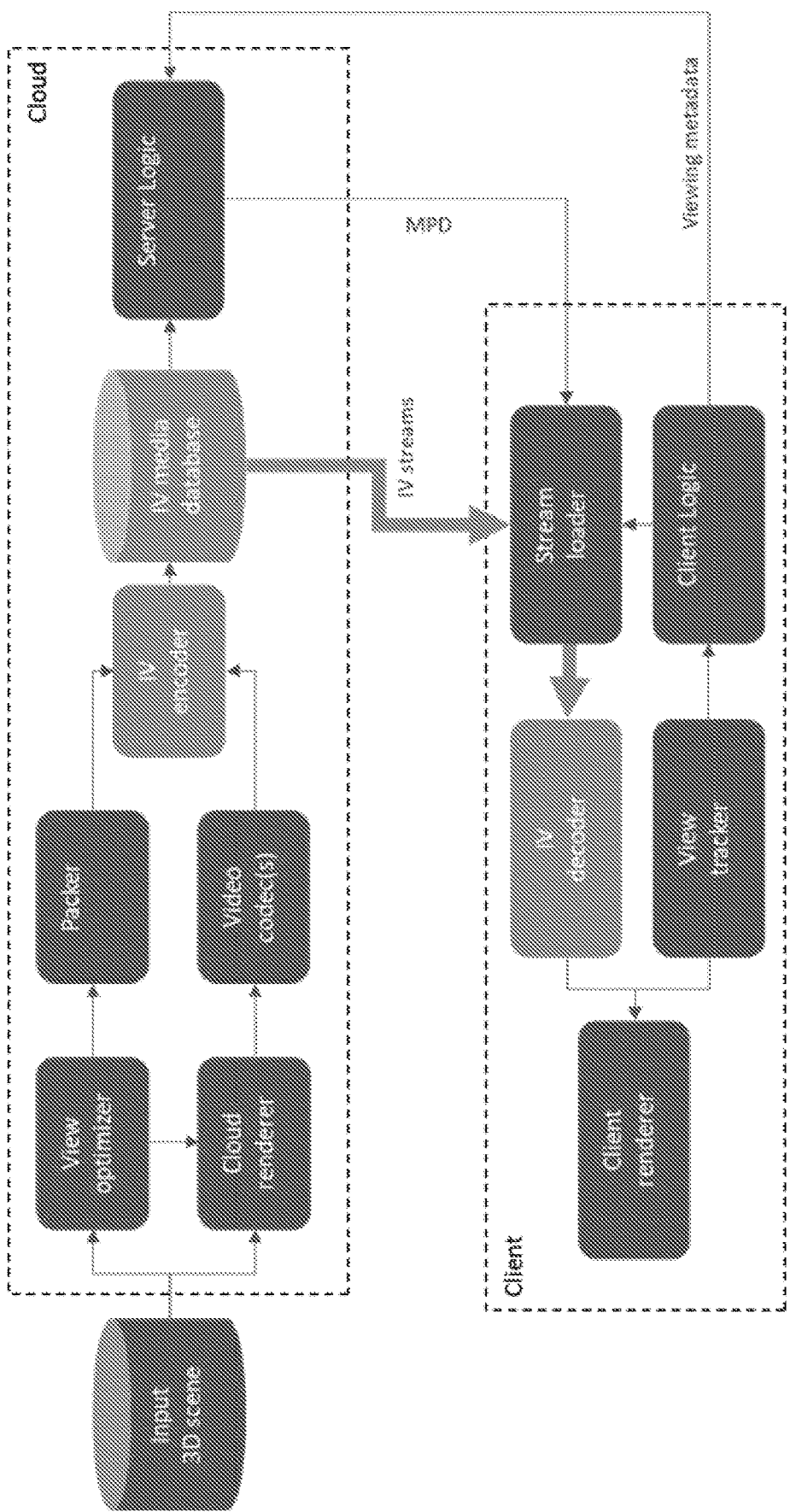
FIG. 4 shows a general principle applied in compression and consumption of a volumetric video scene.

The FIGS. 2a and 2b may be generalized into a concept shown in FIG. 4, which may be considered to represent the basic compression and consumption principles of a volumetric video scene followed by both V-PCC and MIV.

Fundamentally, each frame of the input 3D scene or model is processed separately. The resulting per-frame atlas and metadata are then stored into video and metadata streams, respectively.

Firstly, the input 3D scene is converted into a canonical representation for processing. Depending on the source, the input scene may consist of, for example, a procedurally animated 3D scene, animated 3D meshes, or registered camera views with depth maps. The input is sampled at an internal processing frame rate and converted into a collection of 3D samples of the scene geometry at a specified internal processing resolution. Depending on the input, this may involve e.g. voxelizing a mesh model, or down-sampling a high resolution point cloud with very fine details into the processing resolution. The internal representation is finally a collection of scene data points registered in a common 3D scene coordinate system, representing all aspects of the 3D input scene. Example aspects may include but are not limited to the color, geometry, and surface normals of the 3D scene.

The View-Optimizer takes the internal representation and creates a segmentation of the scene optimized for a specified viewing constraint (the viewing volume). This involves creating view-tiles that have sufficient coverage and resolution for representing the original input scene at minimal quality degradation within the given viewing constraints. The View-Optimizer makes use of at least the 3D position of the data points in the scene, but additional attributes such as surface normals, colors, material attributes, and viewing and capture directions may also be considered. Furthermore, the View Optimizer may divide the view-tiles into several sub viewing volumes if larger movement around the scene is intended and/or the scene is very complex. The sub viewing volumes may be pre-defined by the content author, or automatically generated based on the input scene. The size or bitrate of a single sub viewing volume may be constrained, and all view-tiles in a single sub viewing volume are spatially local to each other to enable efficient streaming.

The resulting view-tiles for one or more sub viewing volumes may then be pre-rendered in the Cloud Rendering stage. This may involve resampling an input point cloud into 2D tile projections, or calling an external renderer, e.g. a path tracing renderer, to render views of a 3D input scene. For natural camera inputs, virtual views may be synthesized by view interpolation between the original input views, or parts of the input views may be used directly to produce the rendered tiles.

Figure 5:
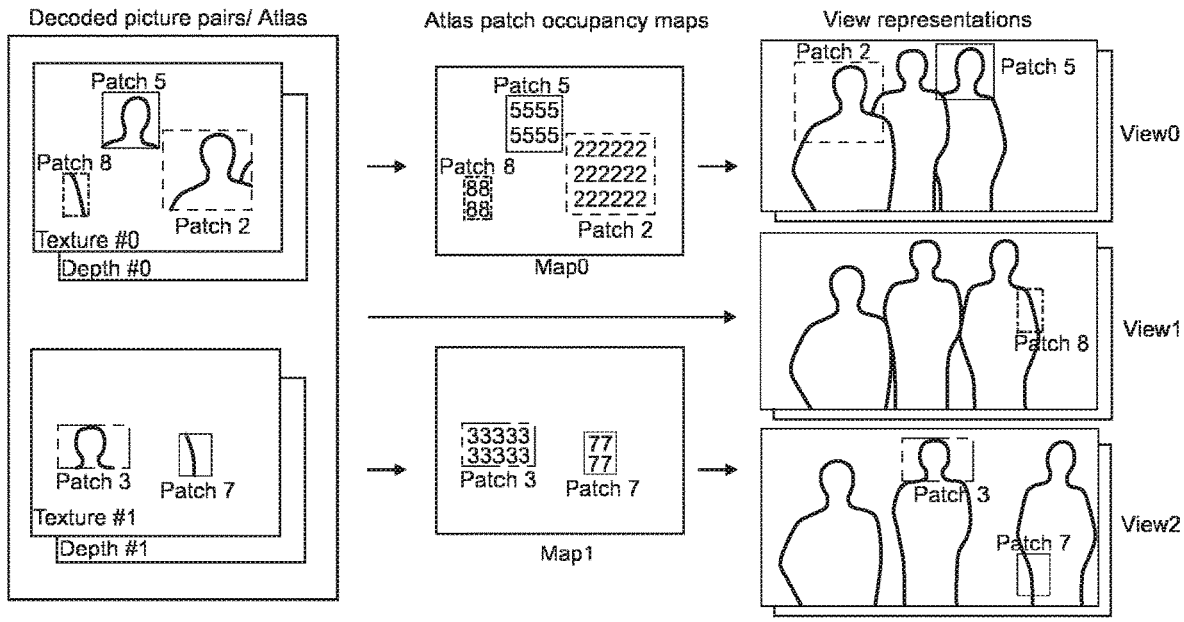
FIG. 5 shows an illustrative example of the relationship between atlases, patches and view representations.

For explaining the relationship between patches, view representations, layer pairs, layers, coded video sequences (CVS), decoded picture pairs, and atlases, a reference is made to the document N18576 "Working Draft 2 of Metadata for Immersive Video (MIV)", ISO/IEC JTC 1/SC 29/WG 11, 6 Aug. 2019, and to the attached FIG. 5 included therein, which shows an illustrative example, in which two atlases contain five patches (patches 2, 3, 5, 7 and 8), which are mapped to three view representations (View0, View1, View2).

The bitstream contains one or more layer pairs, each layer pair having a texture layer and a depth layer. Each layer contains one or more consecutive CVSes in a unique single independent video coding layer, such as a HEVC independent layer, with each CVS containing a sequence of coded pictures.

Each layer pair represents a sequence of atlases. An atlas is represented by a decoded picture pair in each access unit, with a texture component picture and a depth component picture. The size of an atlas is equal to the size of the decoded picture of the texture layer representing the atlas. The depth decoded picture size may be equal to the decoded picture size of the corresponding texture layer of the same layer pair. Decoded picture sizes may vary for different layer pairs in the same bitstream.

A patch may have an arbitrary shape, but in many embodiments it may be preferable to consider the patch as a rectangular region that is represented in both an atlas and a view representation. The size of a particular patch may be the same in both the atlas representation and the view representation.

An atlas contains an aggregation of one or more patches from one or more view representations, with a corresponding texture component and depth component. The atlas patch occupancy map generator process outputs an atlas patch occupancy map. The atlas patch occupancy map is a 2D array of the same size as the atlas, with each value indicating the index of the patch to which the co-located sample in the atlas corresponds, if any, or otherwise indicates that the sample location has an invalid value.

In V-PCC, an atlas comprises all patches required to render the point cloud from any spatial position and orientation, and it is supplemented with an atlas patch occupancy map for all patches and with patch-specific auxiliary information, which indicates e.g. the size of the patch, its location within the atlas and in the view, and the orientation (i.e. rotation and/or mirroring) of the patch.

In MIV, an atlas is used to store a number of patches representing a limited predetermined viewing volume (sub-viewing volume), from where the viewport of the scene may be rendered.

A view representation represents a field of view of a 3D scene for particular camera parameters, for the texture and depth component. View representations may be omnidirectional or perspective, and may use different projection formats, such as equirectangular projection or cube map projection. The texture and depth components of a view representation may use the same projection format and have the same size.

Figure 6:
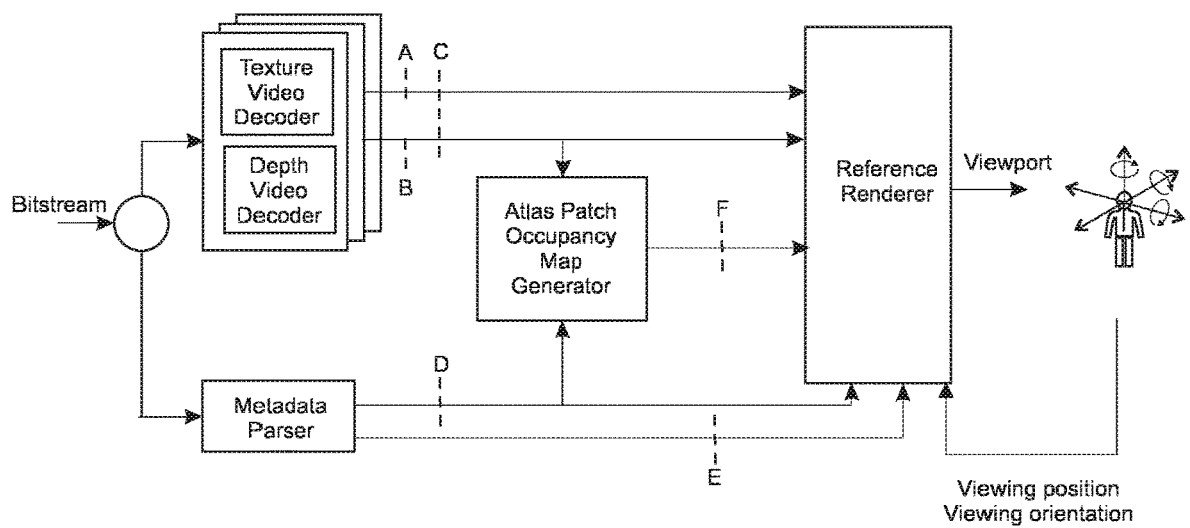
FIG. 6 shows a decoder reference architecture for immersive video.

The decoding process may be illustrated by FIG. 6, which shows a decoder reference architecture for immersive video as defined in N18576. The bitstream comprises a CVS for each texture and depth layer of a layer pair, which is input to a 2D video decoder, such as an HEVC decoder, which outputs a sequence of decoded picture pairs of synchronized decoded texture pictures (A) and decoded depth pictures (B). Each decoded picture pair represents an atlas (C).

The metadata is input to a metadata parser which outputs an atlas parameters list (D), and camera parameters list (E). The atlas patch occupancy map takes as inputs the depth decoded picture (B) and the atlas parameters list (D) and outputs an atlas patch occupancy map (F). In the reference architecture, a hypothetical reference renderer take as inputs one or more decoded atlases (C), the atlas parameters list (D), the camera parameters list (E), the atlas patch occupancy map sequence (F), and the viewer position and orientation, and outputs a viewport.

Both MIV and V-PCC have adopted a pre-processing oriented design to capture patches of the scene or model and store said patches in one or more atlases. For V-PCC all patches required to render the point cloud from any spatial position and orientation are packed into the same atlas. Thus, from all patches included in the atlas, the patches to be rendered and output are selected only at the rendering phase based on the atlas patch occupancy map and the patch-specific auxiliary information. In other words, in most cases an atlas contains a lot of data, which is not needed to render a view from a particular viewing point in space.

The same kind of problem applies to MIV, where the atlases are used to store a limited predetermined viewing volume (sub-viewing volume), where the scene may be rendered from. When a viewer is approaching the edge of the sub-viewing volume, the client may need to request the data from neighbouring sub-viewing volume(s) as well, to guarantee smooth transition from a first sub-viewing volume to a second sub-viewing volume. This means that bandwidth is wasted to transmit at least partly overlapping data as well as data for larger viewing volumes.

In the following, an enhanced method and a client-server architecture for reducing the amount of data to be streamed, while still maintaining smooth transitions when moving between different viewpoints, will be described in more detail, in accordance with various embodiments.

Figure 7:
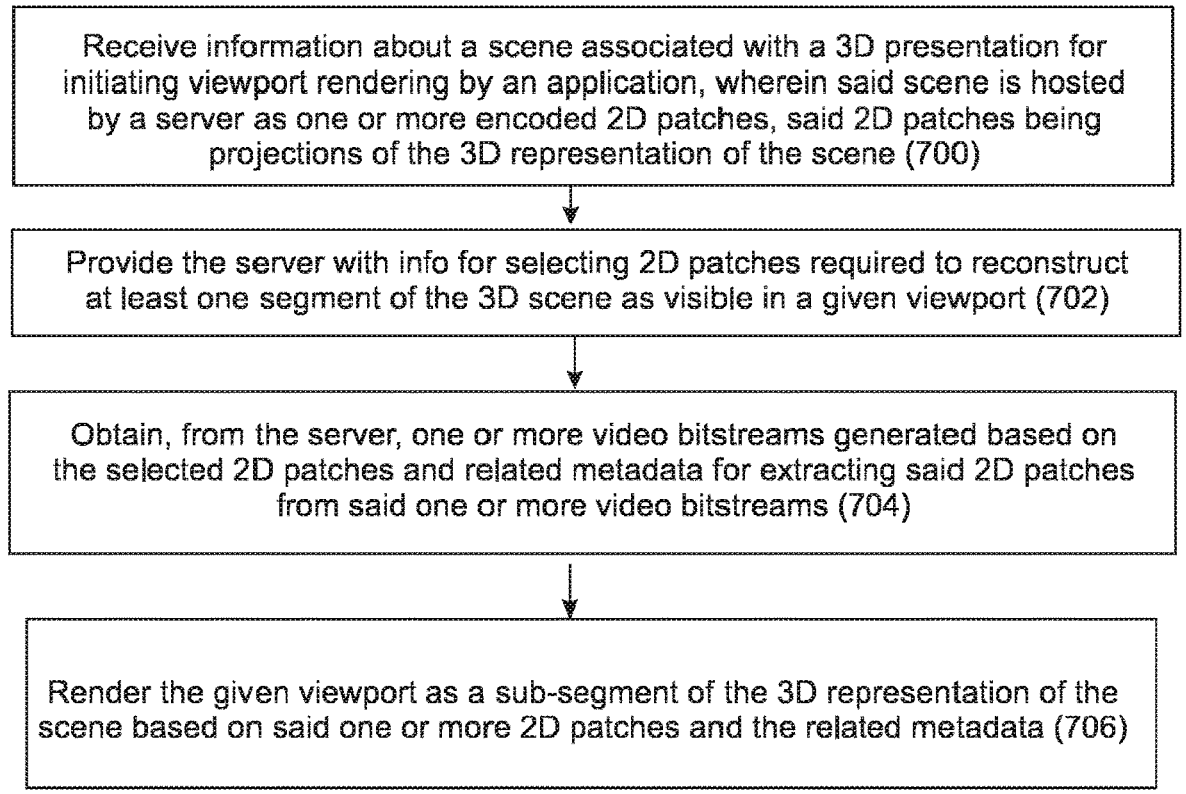
FIG. 7 shows a flow chart for a client viewport update according to an embodiment.

The method, which is disclosed in FIG. 7, comprises receiving (700), by a client device, information about a scene associated with a 3D presentation for initiating viewport rendering by an application, wherein said scene is hosted by a server as one or more encoded 2D patches, said 2D patches being projections of the 3D representation of the scene; providing (702) the server with information for selecting 2D patches required to reconstruct at least one segment of the 3D scene as visible in a given viewport; obtaining (704), from the server, one or more video bitstreams generated based on the selected 2D patches and related metadata for extracting said 2D patches from said one or more video bitstreams; and rendering (706), by the client device, the given viewport as a sub-segment of the 3D representation of the scene based on said one or more 2D patches and the related metadata.

The operation may also be viewed from the perspective of the server. Accordingly, the server is configured to host one or more encoded 2D patches, said 2D patches being projections of a 3D representation of a scene; provide a client with information about the scene for initiating viewport rendering by an application; obtain information for selecting 2D patches required to reconstruct at least one segment of the 3D scene as visible in a given viewport; reconstruct one or more video bitstreams based on selected 2D patches and generating metadata required to extract said 2D patches; and provide the client with said one or more video bitstreams and the related metadata required to extract 2D patches from said one or more video bitstreams.

Thus, instead of providing the client device with a great amount of redundant data not needed for rendering the viewport, the amount of data streamed to the client device is reduced substantially to such data, which may be expected to be needed for rendering the given viewport, and for example performing smooth transition between a first and a second viewport. In order to reduce the amount of information streamed to the client, depending on the embodiment to be described below, either the client or the server is able to analyse the scene and determine, which patches are actually needed for rendering the given viewport. Based on this analysis, the server generates one or more video bitstreams comprising the selected 2D patches as encoded, as well as related metadata for extracting said 2D patches from said one or more video bitstreams. The encoded one or more video bitstreams and the related metadata are provided to the client device for rendering the given viewport as a sub-segment of the 3D representation of the scene.

As used herein, the terms slices, tiles, partitions and sub-pictures are considered to be conceptually equivalent. All terms refer to enabling individual encoding and decoding of information contained in a single video frame. Partition merging allows merging partitions from several video bitstreams into one bitstream, which may be streamed or decoded as a single video bitstream.

In the client-server architecture as described herein, the tasks relating to analysing the scene and defining the patches needed to render the given viewport may be distributed differently between the client and the server.

In the following, embodiments where said tasks are more predominantly carried out by the server are described in more detail.

According to an embodiment, the client device, such as an HMD, is configured to track the position and orientation of the user of the client device so as to generate viewport information about the current (i.e. the first) viewport. The client device is further configured to provide the viewport information to the server. The viewport information may include at least the position of the viewer in the scene, and the orientation of the viewer. The viewport information may further include various information about the actual viewport seen by the user, such as a viewport identification data, identification data for patches rendered for the current viewport and/or the horizontal and vertical field-of-views (HFoV, VFoV) of the current viewport.

According to an embodiment, the server comprises a spatial database configured to store data about patches needed for rendering viewports and their mutual spatial relationship between the viewports. Thus, the data stored in the spatial database facilitates to carry out viewport related queries for requesting information on pre-rendered patches. The data stored in the spatial database also facilitates to request specific patches or video bitstream slices based on their identification data.

According to an embodiment, in response to receiving a signalling about a desired viewport from the client device, the server is configured to identify the 2D patches needed for rendering the viewport. Thus, the server accesses the spatial database to find which patches overlap with the given viewport. The server may carry out a viewport related query in the spatial database to find relevant patches to render the requested given viewport, as well as to render views around the requested given viewport.

According to an embodiment, the patches needed for rendering the viewport are provided with one or more guard-band patches around said viewport. The purpose of including patches around said viewport as a guard-band is to provide as little additional information around the requested viewport as possible in order to adapt for minor movement of the user without having to request frames one by one from the server. The guard-band may preferably be adaptable according to the length of the coded video sequence. The longer the duration of an intra-period, the larger may the guard band be, and vice versa. Hence, large intra-periods require streaming more information to the client device.

According to an embodiment, the server may be configured to pack said identified 2D patches into one or more novel atlases; encode the novel atlases into said one or more video bitstreams; generate metadata describing the layout of 2D patches on the atlases; generate one or more metadata bitstream containing said layout of the 2D patches and information required to re-project said 2D patches into the 3D representation; and provide said one or more generated video bitstreams and said associated one or more metadata bitstreams to the client.

According to a further embodiment, upon identifying the 2D patches, the server may be configured to identify one or more encoded video bitstream slices or partitions containing identified 2D patches; and upon generating said one or more video bitstreams, the server may be configured to process information related to identified encoded video bitstream slices and partitions in order to reduce the number of overall video bitstreams.

Figure 8:
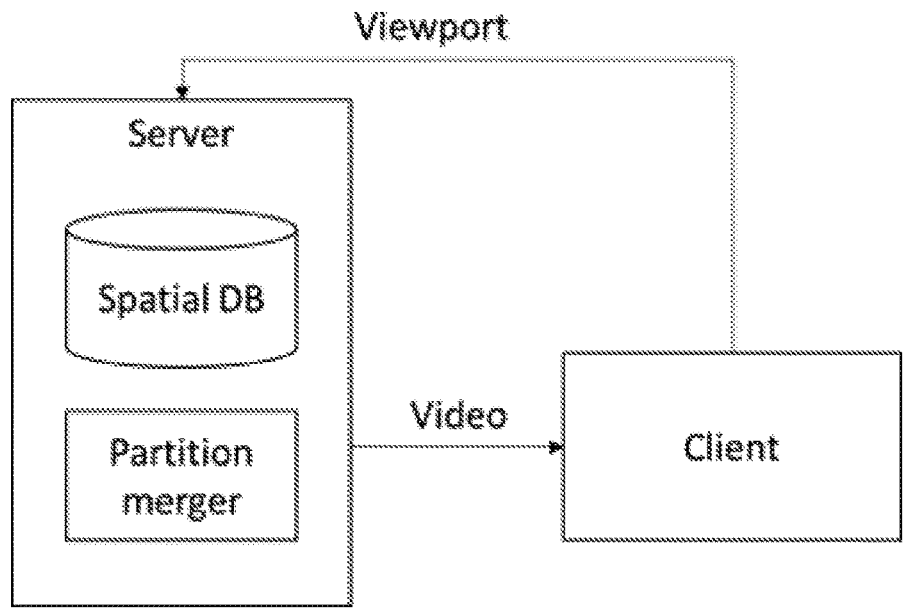
FIG. 8 shows a client-server arrangement according to an embodiment.

Thus, the server may be configured to maintain, for example in the spatial database, slices of encoded video bitstreams containing patches typically rendered together. Based on the patches needed for rendering the viewport, the server may be configured to constructs a novel video bitstream from the bitstream partitions with required patches by merging partitions from several video bitstreams into one bitstream, as disclosed in FIG. 8. The novel bitstream is streamed to the client device with relevant metadata, which associate atlases and slices with patches and views. The partitions may be considered as tile groups as specified in MPEG 23090-5. The embodiment requires no run-time video encoding as the bitstream slices are already encoded, only bitstream merging is required to construct the novel video bitstream.

Figure 9:
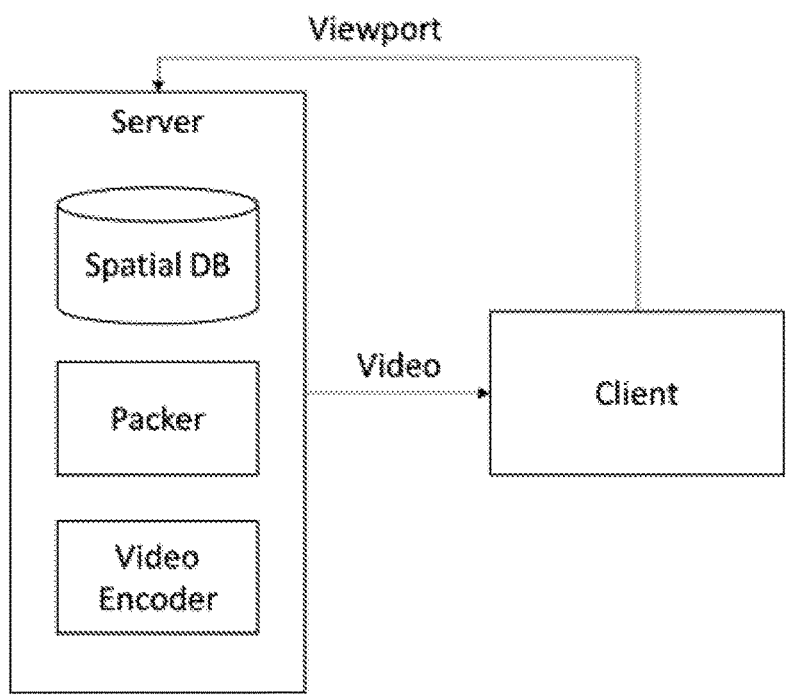
FIG. 9 shows a client-server arrangement according to another embodiment.

According to an embodiment, the server may be configured to maintain, for example in the spatial database, raw image data for the patches to reduce latency required by reading images from a disk. Various caching techniques may equally be used, e.g. if it is not preferable or possible to store the raw image data of an entire scene in the database. Alternatively, the server may be a sharded instance where specific shards are responsible for hosting a specific part of the scene in memory. The server determines the needed patches and the image data associated with the patches, and then server defines a layout of the patches on an atlas and formulates a metadata bitstream. The image data will be copied and packed in an atlas in a packer, as disclosed in FIG. 9. The atlas is sent to a video encoder, which is preferably configured to minimize the latency of encoding. The encoder encodes the atlases for streaming to the client device. The encoder is further supplemented with the metadata bitstream, which is included to be streamed in or along the bitstream containing the encoded atlas data.

The encoded video bitstreams are streamed to the client device, which will synthesize novel views from the received atlases. Thus, the client is not restricted to fixed sub-viewing-volumes and will not become subject to situations where the client would need to load sub-viewing-volume patch data from multiple sub-viewing-volumes.

In the following, embodiments where tasks relating to analysing the scene and defining the patches needed to render the given viewport are more predominantly carried out by the client device are described in more detail. Such embodiments help reducing the processing load of the server.

According to an embodiment, the server may be configured to maintain data describing a division of the scene into a plurality of sub-viewing-volumes, wherein each sub-viewing-volume is associated with one or more slices and/or atlases of volumetric data. The sub-viewing-volumes may be defined as bounding boxes, visibility cones or similar concepts which enable grouping of patches, tile-groups or atlases based where they may be viewed.

Figure 10:
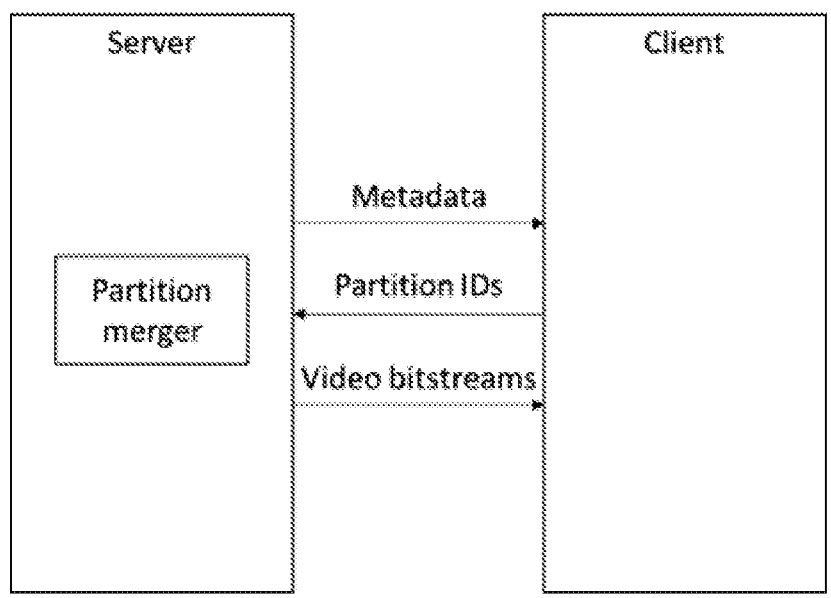
FIG. 10 shows a client-server arrangement according to yet another embodiment.

According to an embodiment, the server may be configured signal metadata comprising sub-viewing-volume related information to the client device, as disclosed in FIG. 10.

According to an embodiment, the metadata comprising the sub-viewing-volume related information may be made available through DASH manifest files.

According to another embodiment, the sub-viewing-volume related information may be signalled off-band, for example as HTTP+JSON (JavaScript Object Notation), and DASH may only be used to stream the encoded bitstreams to the client. Such approach provides enhanced scalability.

Based on the metadata comprising sub-viewing-volume related information, the client device determines which parts of the sub-viewing volume information is required to render the required part of the scene, i.e. the desired viewport.

According to an embodiment, the sub-viewing-volume data may be encoded in bitstream partitions or slices stored in the server, and the client device may be configured to request bitstream partitions or slices based on their identification from the server, as disclosed in FIG. 10. The server may merge one or more bitstream slices into one or more novel video bitstreams which may be streamed to the client device. These video bitstreams may be streamed to the client, for example, using DASH. Additional metadata may need to be streamed in or along the video bitstreams to map requested partition-ids with actual partition layout on a video encoded frame.

Figure 11:
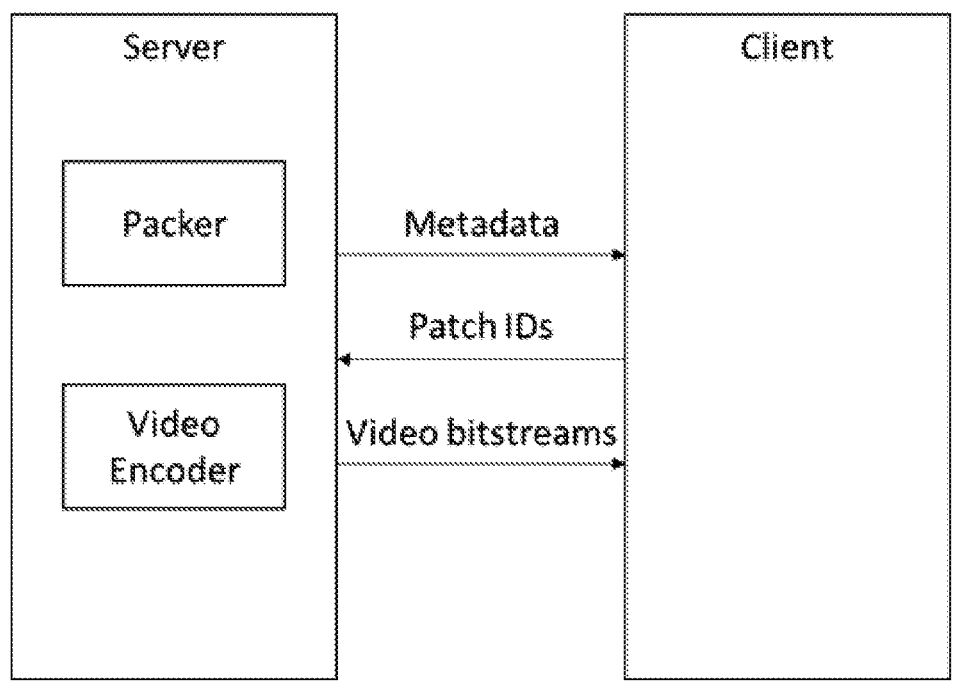
FIG. 11 shows a client-server arrangement according to a further embodiment.

According to an embodiment, the sub-viewing-volume data may be stored as patch-specific raw image data in the server, and the client device may be configured to request the patch-specific raw image data based on their identification from the server, as disclosed in FIG. 11. The server packs the patches into one or atlases and encodes atlases into video bitstreams which are streamed to the client. Additional metadata describing the patch-id layout on the frame may need to be streamed in or along the video bitstream to enable mapping of requested patch-ids with the realized patch layout on the encoded video frame. Upon receiving the video bitstream(s), the client device is configured to render the required part of the scene, i.e. the desired viewport, and to request more data, if necessary, from the server based on the scene information.

Features from the above server- and client-based embodiments may also be combined. According to an embodiment, the client may be configured to receive one or more atlases of video encoded volumetric data and, based on the metadata defining the patches and/or slices needed for rendering the desired viewport, defined either by the client device or the server, the client device is configured to extract bitstream slices from atlases and construct a customized atlas for rendering the viewport.

According to a further embodiment, the client may be configured to identify 2D patches, partitions or slices required to render a viewport, based on received metadata; and process the one or more received video bitstreams to generate one or more novel video bitstreams in order to reduce the number of video decoder instances required to decode identified 2D patches; wherein the processing of received video bitstreams includes rewriting slice headers of video coding partitions.

While such combined approaches do not provide savings in streaming bandwidth, since the full set of atlases is streamed to the client in the encoded video bitstreams, they provide an advantage of enabling the combined atlas to be decoded using fewer video decoder instances than would be required to decode all atlases. It is noted that video decoder instances are a practical limitation in many mobile devices in particular.

A further advantage provided by the above approach is that the local bitstream extraction has lower round-trip latency from viewer motion to decoding than any server-based implementation. This enables the client to make a more accurate decision about which streams are necessary for rendering, in contrast to the server-based implementations that require a larger guard band of potentially useful data to account for viewer motion between stream packing and rendering. Thus, such client-local merging approach requires the smallest amount of data to pass through the video decoder and enter the rendering pipeline.

This local processing can naturally be combined with the server-based methods to achieve the highest overall performance over the entire content delivery pipeline.

The embodiments relating to the client device may be implemented in an apparatus comprising: means for receiving information about a scene associated with a 3D presentation for initiating viewport rendering by an application, wherein said scene is hosted by a server as one or more encoded 2D patches, said 2D patches being projections of the 3D representation of the scene; means for providing the server with information for selecting 2D patches required to reconstruct at least one segment of the 3D scene as visible in a given viewport; means for obtaining, from the server, one or more video bitstreams generated based on the selected 2D patches and related metadata for extracting said 2D patches from said one or more video bitstreams; and means for rendering the given viewport of as a sub-segment of the 3D representation of the scene based on said one or more 2D patches and the related metadata.

The embodiments relating to the client device may likewise be implemented in an apparatus comprising at least one processor and at least one memory, said at least one memory stored with computer program code thereon, the at least one memory and the computer program code configured to, with the at least one processor, cause the apparatus at least to perform: receive information about a scene associated with a 3D presentation for initiating viewport rendering by an application, wherein said scene is hosted by a server as one or more encoded 2D patches, said 2D patches being projections of the 3D representation of the scene; provide the server with information for selecting 2D patches required to reconstruct at least one segment of the 3D scene as visible in a given viewport; obtain, from the server, one or more video bitstreams generated based on the selected 2D patches and related metadata for extracting said 2D patches from said one or more video bitstreams; render the given viewport as a sub-segment of the 3D representation of the scene based on said one or more 2D patches and the related metadata.

The embodiments relating to the server may be implemented in an apparatus comprising means for hosting one or more encoded 2D patches, said 2D patches being projections of a 3D representation of a scene; means for providing a client with information about the scene for initiating viewport rendering by an application; means for obtaining information for selecting 2D patches required to reconstruct at least one segment of the 3D scene as visible in a given viewport; means for reconstructing one or more video bitstreams based on selected 2D patches and generating metadata required to extract said 2D patches; and means for providing the client with said one or more video bitstreams and the related metadata required to extract 2D patches from said one or more video bitstreams.

The embodiments relating to the server aspects may likewise be implemented in an apparatus comprising at least one processor and at least one memory, said at least one memory stored with computer program code thereon, the at least one memory and the computer program code configured to, with the at least one processor, cause the apparatus at least to perform: host one or more encoded 2D patches, said 2D patches being projections of a 3D representation of a scene; provide a client with information about the scene for initiating viewport rendering by an application; obtain information for selecting 2D patches required to reconstruct at least one segment of the 3D scene as visible in a given viewport; reconstruct one or more video bitstreams based on selected 2D patches and generating metadata required to extract said 2D patches; and provide the client with said one or more video bitstreams and the related metadata required to extract 2D patches from said one or more video bitstreams.

Such apparatuses may comprise e.g. the functional units disclosed in any of the FIGS. 1*a*, 1*b*, 2*a*, 2*b* and 3 for implementing the embodiments.

In the above, some embodiments have been described with reference to encoding. It needs to be understood that said encoding may comprise one or more of the following: encoding source image data into a bitstream, encapsulating the encoded bitstream in a container file and/or in packet(s) or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, where the example embodiments have been described with reference to an encoder or an encoding method, it needs to be understood that the resulting bitstream and the decoder or the decoding method may have corresponding elements in them. Likewise, where the example embodiments have been described with reference to a decoder, it needs to be understood that the encoder may have structure and/or computer program for generating the bitstream to be decoded by the decoder.

In the above, some embodiments have been described with reference to encoding or decoding texture pictures, geometry pictures, (optionally) attribute pictures and auxiliary patch information into or from a single bitstream. It needs to be understood that embodiments can be similarly realized when encoding or decoding texture pictures, geometry pictures, (optionally) attribute pictures and auxiliary patch information into or from several bitstreams that are associated with each other, e.g. by metadata in a container file or media presentation description for streaming.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. A method comprising:
receiving, by a client device, information about a scene associated with a three-dimensional presentation for initiating viewport rendering by an application, wherein said scene is hosted by a server as one or more encoded two-dimensional patches, said two-dimensional patches being projections of the three-dimensional representation of the scene;
providing the server with information for selecting two-dimensional patches required to reconstruct at least one segment of the three-dimensional scene as visible in a given viewport;
obtaining, from the server, one or more video bitstreams generated based on the selected two-dimensional patches and related metadata for extracting said two-dimensional patches from said one or more video bitstreams;
identifying two-dimensional patches, partitions or slices required to render the viewport, based on the obtained metadata;
processing the one or more obtained video bitstreams to generate one or more novel video bitstreams to reduce a number of video decoder instances required to decode the identified two-dimensional patches, wherein the processing of obtained video bitstreams includes rewriting slice headers of video coding partitions; and
rendering, by the client device, the given viewport as a sub-segment of the three-dimensional representation of the scene based on said one or more two-dimensional patches and the related metadata.

2. The method according to claim 1, further comprising:
tracking a position and an orientation of a user of an apparatus for generating the information about the viewport.

3. The method according to claim 2, wherein the information about the viewport comprises one or more of the following:
a position of the viewer in the scene;
an orientation of the viewer;
a viewport identification data; or
a horizontal and a vertical field-of-views (HFoV, VFoV) of the viewport.

4. An apparatus comprising at least one processor and at least one non-transitory memory, said at least one memory stored with computer program code thereon, the at least one memory and the computer program code configured to, with the at least one processor, cause the apparatus at least to:
receive information about a scene associated with a three-dimensional presentation for initiating viewport rendering by an application, wherein said scene is hosted by a server as one or more encoded two-dimensional patches, said two-dimensional patches being projections of the three-dimensional representation of the scene;
provide the server with information for selecting two-dimensional patches required to reconstruct at least one segment of the three-dimensional scene as visible in a given viewport;
obtain, from the server, one or more video bitstreams generated based on the selected two-dimensional patches and related metadata for extracting said two-dimensional patches from said one or more video bitstreams;
identify two-dimensional patches, partitions or slices required to render the viewport, based on obtained metadata;
process the one or more obtained video bitstreams to generate one or more novel video bitstreams to reduce a number of video decoder instances required to decode identified two-dimensional patches, wherein the processing of obtained video bitstreams includes rewriting slice headers of video coding partitions; and
render the given viewport as a sub-segment of the three-dimensional representation of the scene based on said one or more two-dimensional patches and the related metadata.

5. The apparatus according to claim 4, wherein the apparatus is further caused to:
track a position and an orientation of a user of the apparatus for generating the information about the viewport.

6. The apparatus according to claim 5, wherein the information about the viewport comprises one or more of the following:
a position of the viewer in the scene;
an orientation of the viewer;
a viewport identification data; and
horizontal and vertical field-of-views (HFoV, VFoV) of the viewport.

7. A method comprising:
hosting, by a server, one or more encoded two-dimensional patches, wherein said two-dimensional patches being projections of a three-dimensional representation of a scene;
providing a client with information about the scene for initiating a viewport rendering by an application;
obtaining information for selecting two-dimensional patches required to reconstruct at least one segment of the three-dimensional scene as visible in a given viewport;
reconstructing one or more video bitstreams based on selected two-dimensional patches and generating metadata required to extract said two-dimensional patches;
providing the client with said one or more video bitstreams and the related metadata required to extract two-dimensional patches from said one or more video bitstreams; and
configuring a spatial database to store data about patches needed for rendering viewports and mutual spatial relationship between the viewports.

8. The method according to claim 7, further comprising:
identifying two-dimensional (2D) patches, representing a sub-segment of the three-dimensional (3D) scene, required to render the given viewport.

9. The method according to claim 8, further comprising:
packing said identified 2D patches into one or more novel atlases;
encoding the novel atlases into one or more novel video bitstreams;
generating metadata describing a layout of 2D patches on atlases;
generating one or more metadata bitstream comprising said layout of the 2D patches and information required to re-project said 2D patches into the 3D representation; and
providing said one or more generated novel video bitstreams and associated one or more metadata bitstreams to the client.

10. The method according to claim 8, wherein
said identifying 2D patches comprises identifying one or more encoded video bitstream slices or partitions containing identified 2D patches; and
said generating said one or more video bitstreams comprises processing information related to identified encoded video bitstream slices and partitions in order to reduce the number of overall video bitstreams.

11. An apparatus comprising at least one processor and at least one non-transitory memory, said at least one memory stored with computer program code thereon, the at least one memory and the computer program code configured to, with the at least one processor, cause the apparatus at least to:
host one or more encoded two-dimensional patches, wherein said two-dimensional patches being projections of a three-dimensional representation of a scene;
provide a client with information about the scene for initiating a viewport rendering by an application;
obtain information for selecting two-dimensional patches required to reconstruct at least one segment of the three-dimensional scene as visible in a given viewport;
reconstruct one or more video bitstreams based on selected two-dimensional patches and generating metadata required to extract said two-dimensional patches;
provide the client with said one or more video bitstreams and the related metadata required to extract two-dimensional patches from said one or more video bitstreams; and
configure a spatial database to store data about patches needed for rendering viewports and mutual spatial relationship between the viewports.

12. The apparatus according to claim 11, wherein the apparatus is further caused to:
identify two-dimensional (2D) patches, representing a sub-segment of the three-dimensional (3D) scene, required to render the given viewport.

13. The apparatus according to claim 12, wherein the apparatus is further caused to:
pack said identified 2D patches into one or more novel atlases;
encode the novel atlases into one or more novel video bitstreams;
generate metadata describing a layout of 2D patches on atlases;
generate one or more metadata bitstream comprising said layout of the 2D patches and information required to re-project said 2D patches into the 3D representation; and
provide said one or more generated novel video bitstreams and associated one or more metadata bitstreams to the client.

14. The apparatus according to claim 11, wherein:
to identify two-dimensional (2D) patches, the apparatus is further caused to identify one or more encoded video bitstream slices or partitions containing identified 2D patches; and
to generate said one or more video bitstreams, the apparatus is further caused to process information related to identified encoded video bitstream slices and partitions in order to reduce the number of overall video bitstreams.

15. The apparatus according to claim 11, wherein the apparatus is further caused to:
provide the patches needed for rendering the given viewport with one or more guard-band patches around said given viewport.

16. The apparatus according to claim 11, wherein the apparatus is further caused to: maintain data describing a division of the scene into a plurality of sub-viewing-volumes;
signal said metadata to a client device; and
provide the client device, upon receiving a request for a part of at least one sub-viewing-volume, with an encoded bitstream comprising said part of the at least one sub-viewing-volume.

* * * * *